United States Patent [19]

Cotton et al.

[11] Patent Number: 4,892,022

[45] Date of Patent: Jan. 9, 1990

[54] SAFETY GUARD FOR SAWING POWER TOOL PARTICULARLY MITRE SAW

[75] Inventors: Lawrence M. Cotton; John C. Derler, both of New Bern, N.C.

[73] Assignee: Robert Bosch Power Tool Corporation, New Bern, N.C.

[21] Appl. No.: 246,614

[22] Filed: Sep. 20, 1988

[51] Int. Cl.⁴ .......................... B27B 5/18; B23D 45/04

[52] U.S. Cl. .......................... 83/478; 30/390; 30/391; 83/490

[58] Field of Search .................. 30/295, 375, 376, 370, 30/382, 388, 390, 381; 83/478, 397, 490

[56] References Cited

U.S. PATENT DOCUMENTS

| | | | |
|---|---|---|---|
| 1,780,173 | 11/1930 | Crowe | 30/391 |
| 1,850,444 | 3/1932 | Brumell | 30/391 |
| 2,876,810 | 3/1959 | Peterson et al. | 30/391 X |
| 4,343,213 | 8/1982 | Drixler | 83/478 X |
| 4,581,966 | 4/1986 | Kaiser et al. | 83/397 |

*Primary Examiner*—Douglas D. Watts
*Assistant Examiner*—Kenneth E. Peterson
*Attorney, Agent, or Firm*—Michael J. Striker

[57] ABSTRACT

A saw blade guard for a sawing power tool, particularly a mitre saw, comprises a protective element having two side walls each formed as a part of a circle, and a peripheral wall connecting the side walls with one another, the side walls having a center and an edge spaced from the center, the protective element being formed as an integral element and provided with a member in the region of the edge for turning the protective element as a whole.

14 Claims, 4 Drawing Sheets

SAFETY GUARD FOR SAWING POWER TOOL PARTICULARLY MITRE SAW

BACKGROUND OF THE INVENTION

The present invention relates to a safety guard for a sawing power tool, particularly a mitre saw.

Safety guards are well known in the art and used in the sawing power tool for protecting the operator from a rotatable saw blade during sawing of workpieces. A known safety guard includes an upper stationary part which is fixedly connected with the housing of the power tool and does not move during the operation, and a lower part which is pivotable relative to the upper part. The sagety guard of this construction possesses some disadvantages. The construction of the safety guard composed of two pieces is rather complicated. Since one part is telescopically movable into the other part, the overall size of the safety guard is increased. For the same reason, it has a relatively high material consumption. It is to be understood that it is desirable to eliminate the above mentioned disadvantages.

SUMMARY OF THE INVENTION

Accordingly, it is an object of the present invention to provide a safety guard for a sawing power tool such as a mitre saw, which avoids the disadvantages of the prior art.

In keeping with these objects and with others which will become apparent hereinafter, one feature of the present invention resides, briefly stated, in a safety guard of the above mentioned general type which has a protective element including two side walls formed as a part of a circle and a peripheral wall connecting the side walls with one another, wherein the protective element is formed as a one-piece integral element and provided in the region of its one edge with means for turning as a whole.

When the safety guard is designed in accordance with the present invention, it has a simpler construction, is easier and cheaper to manufacture, less material consuming than known safety guards.

In accordance with another feature of the present invention, an additional cover is provided for closing and opening a central opening provided in the center of the protective element for allowing access to a saw blade shaft.

The same side wall of the protective element which is provided with an opening closeable by the cover can also be provided with a raised portion which forms a curved channel for a saw blade shaft so that the latter does not interfere with the front wall of the guard during turning.

A further feature of the present invention is that another side wall of the safety guard is provided with a curved opening through which an opposite end of the saw blade shaft extends during turning of the protective element. Also, the rear wall can be provided with a projection which slides over a sawing power tool housing during turning of the safety guard. Finally the rear wall can also be provided with a guiding curved opening through which the guiding pin on the housing extends, to guide the safety guard during turning.

The walls of the protective element can be transparent, translucent or opaque. In accordance with an especially advantageous embodiment of the present invention, the upper part of the front wall is opaque, while the lower part is transparent. This construction is highly advantageous in that only the lower part of the protective element is transparent so that the operator concentrates only on the lower cutting region of the saw blade, and at the same time his attention is not distracted by the upper part of the saw blade which is not visible through the opaque portion of the safety guard.

Finally, the turning point of the safety guard can be formed by two openings provided in the side walls, and in addition by a boss which is located between the side walls in the region of the edge and has an opening coinciding with the openings of the side walls.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
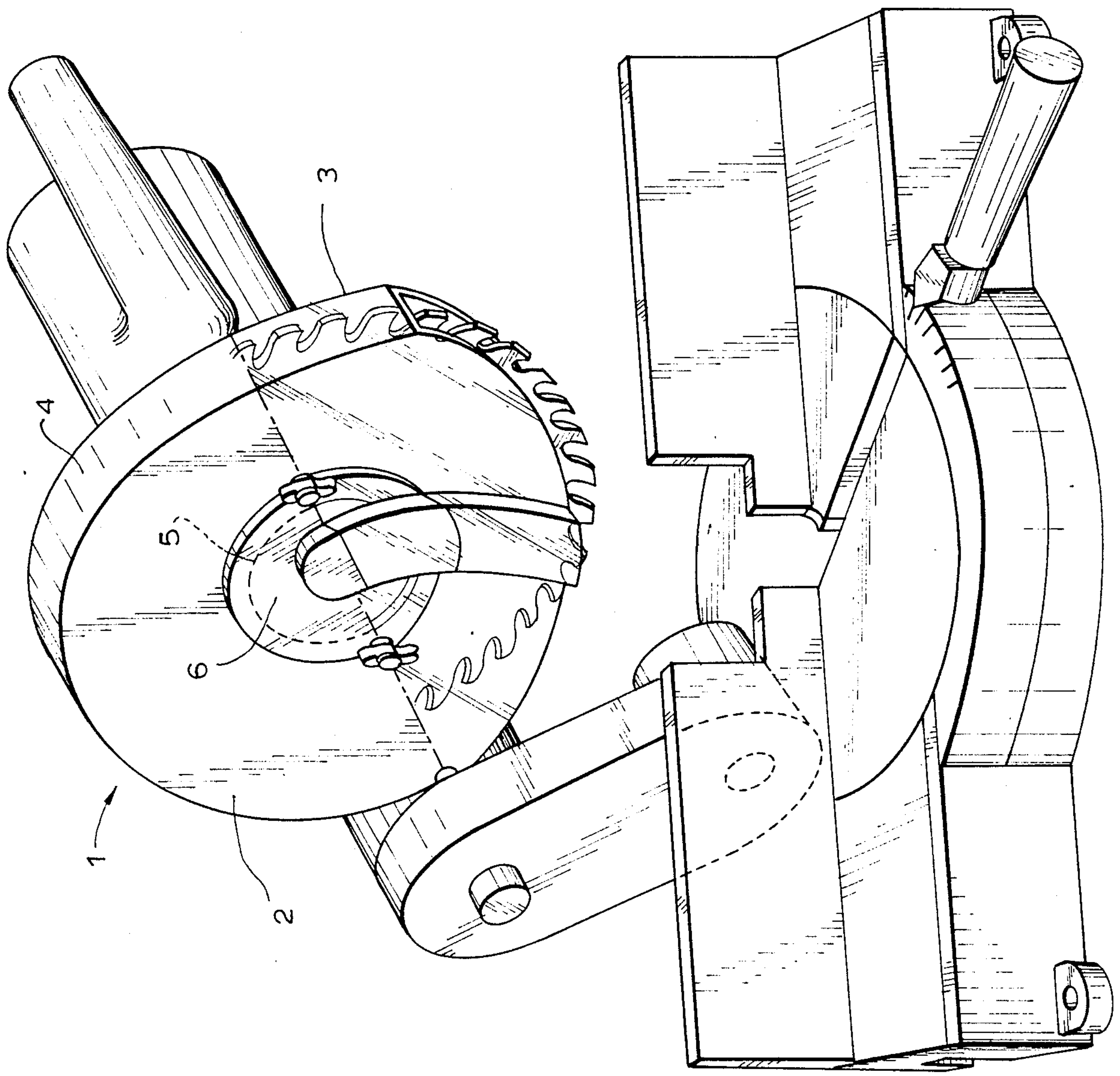
FIG. 1 is a perspective view showing a part of a sawing power tool, particularly a mitre saw, with a safety guard in accordance with the present invention.
Figure 2:
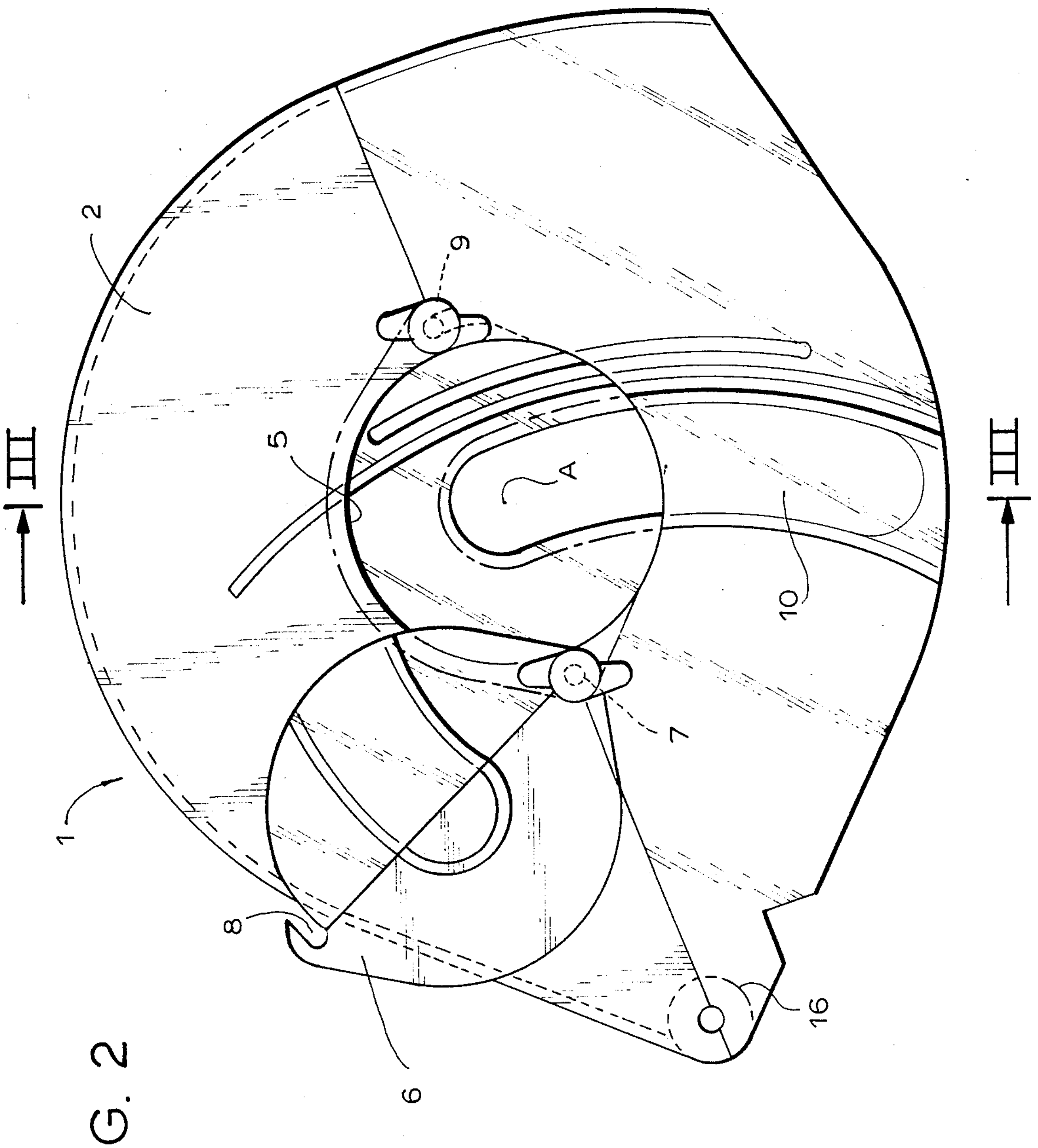
FIG. 2 is a front view of the safety guard of the present invention.
Figure 3:
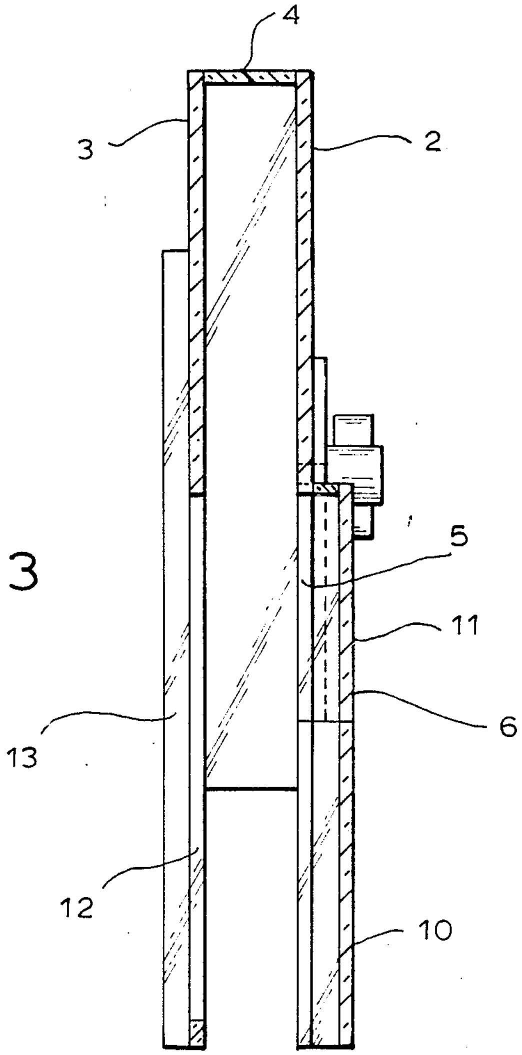
FIG. 3 is view of the inventive safety guard.
Figure 5:
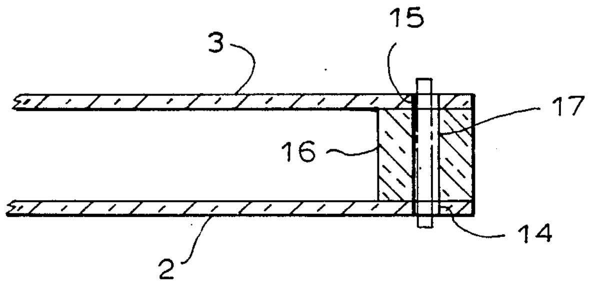
FIG. 5 is a view showing a section taken along the line V—V in FIG. 4.
Figure 4:
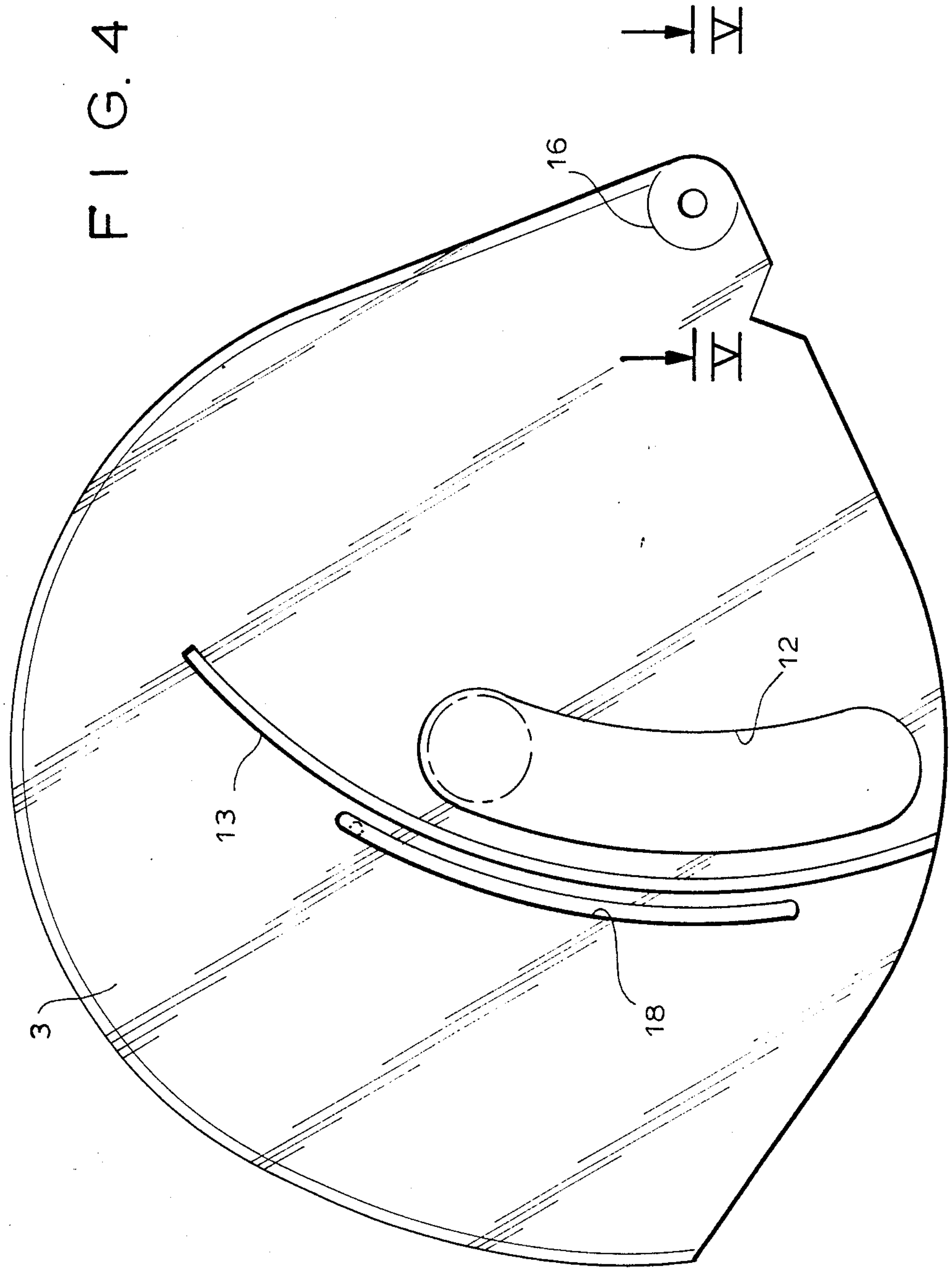
FIG. 4 is a rear view of the inventive safety guard.

A safety guard for a sawing power tool particularly a mitre saw has a protective element which is identified as a whole with reference numeral 1. The protective element has a front side wall 2 and a rear side wall 3 which are formed as portions of a circle with a center A. The front and rear walls 2 and 3 are connected with one another by a peripheral wall 4. The protective element 1 with all its walls is formed as an integral member composed for example of a synthetic plastic material such as polycarbonate. It can be formed as a one-piece molded element. As can be seen from the drawings, in contrast to known constructions, the side walls extend both in the upper region of the safety guard substantially above its axis A and in the lower region of the safety guard substantially below its center A, so that each side wall is a one-piece member and its upper and lower portions are not turnable relative to one another as in the existing guards.

The front wall 2 which faces toward an operator's left during the operation is provided with a central opening 5. Through this opening an operator has access to a shaft of the saw blade for mounting a saw blade or replacing one saw blade with another saw blade. The opening 5 can be closed during the operation by a cover 6. The cover 6 is turnable between an open position which is shown in the drawing in a solid line and in which the opening 5 is unobstructed, and a closed position which is shown in the drawing in broken line and in which the opening 5 is closed. For turning of the cover 6 between these two positions, the cover is provided with a circumferentially closed opening 7 on its one side and a partially open opening 8 on its other side. Two screws 9 extend through respective openings in the cover 6 and into threaded openings into the front wall 2. When the cover 6 is turned from its open position to its closed position, the opening 8 engages over the screw 9, and then the screws 9 are tightened so as to tightly press the cover 6 against the front wall 2 and to reliably close the opening 5.

The front wall 2 of the protective element 1 may also be provided with a portion 10 which extends in a plane raised relative to a plane of a remaining part of the front wall 2. The raised portion 10 forms a curved channel through which a front end of the saw blade shaft extends during turning of the protective element 1. This channel also extends into a cover 6 which is also provided with a raised portion 11 for the same purpose.

The rear wall 3 of the protective element 1 is provided with a relatively wide curved opening 12. An opposite end of the saw blade shaft extends through the curved opening 12 so that during turning of the protective element 1 the opposite end of the saw blade shaft does not interfere with the rear wall 3. The rear wall 3 is also provided with a rib 13 which projects rearwardly beyond the plane of the rear wall 3. During turning of the protective element 1 the rib 13 slidingly abuts against a housing of the sawing power tool, so that the protective element 1 as a whole is retained at a predetermined distance from the housing.

A turning point of the protective element 1 is provided in the region of one edge of the side walls 2 and 3. The turning point can be formed by openings 14 and 15 provided in the walls 2 and 3, so that a pivot pin mounted on the housing of the power tool extends through the openings 14 and 15. For insuring a large sliding surface, an additional boss 16 can be arranged between the walls 2 and 3 and provided with a central opening 17 which is coaxial with the openings 14 and 15, so that the housing pin is in a sliding contact with the thus increased surface.

At a location which is spaced from the turning point and located at an opposite end of the axis A, guiding means are provided for guiding the turning of the protective element 1. The guiding means includes a narrow curved slot 18 provided in the rear wall 3 of the protective element 1. The housing of the sawing power tool has a pin which extends through the slot 18 and guides the protective element 1 during its turning about the turning point.

The protective element or at least its side walls can be made transparent, translucent or opaque. In accordance with an advantageous embodiment of the present invention, the upper part of the front wall 2 can be opaque, while the lower part of the front wall 2 is transparent. This can be achieved by making the front wall of a transparent material and then painting its upper part. With the thusly constructed front wall, the attention of an operator is directed only to the lower part of a saw blade which is visible through the lower transparent part of the front wall 2.

It will be understood that each of the elements described above, or two or more together, may also find a useful application in other types of constructions differing from the types described above.

While the invention has been illustrated and described as embodied in a safety guard for a sawing power tool particularly a mitre saw, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A saw blade guard for a sawing power tool, particularly a mitre saw, comprising a protective element having two side walls each formed as a part of a circle, and a peripheral wall connecting said side walls with one another, said side walls having a center and an edge spaced from said center, said protective element being formed as an integral element and provided with means in the region of said edge for turning said protective element as a whole, one of said side walls of said protective element being provided with a central opening for allowing access to a saw blade shaft of the sawing power tool; a cover associated with said central opening and movable between a first position in which it is spaced from said central opening to allow access to the saw blade shaft and a second position in which it covers said central opening.

2. A safety guard as defined in claim 1, wherein said cover has two diametrically opposite ends, one of said ends of said cover being permanently pivotally connected with said protective element while the other of said ends of said cover having an engaging formation arranged to engage said protective element in said second position and disengage said protective element in said first position.

3. A safety guard as defined in claim 2; and further comprising two pin-shaped elements arranged so that one of said pin-shaped elements permanently pivotally connect said one end of said cover with said protective element while the other of said pin-shaped elements is engaged by said other end of said cover in said second position and disengaged from the same in said first position.

4. A safety guard as defined in claim 1, wherein one of said walls of said protective element has a greater portion extending in one plane and a smaller portion extending in another plane which is raised relative to said one plane in the axial direction, said other portion forming a curved channel such that during turning said protective element, said channel moves over a saw blade shaft without interfering therewith.

5. A safety guard as defined in claim 4, wherein the other of said side walls has a curved opening formed so that during turning of said protective element, the saw blade shaft extends through said curved opening without interfering with said protective element.

6. A safety guard as defined in claim 1; and further comprising a guiding element arranged to guide said protective element during its turning, said guiding element being formed as a curved slot which is spaced from said edge and formed so that a pin provided on a sawing power tool housing is guided in said slot.

7. A safety guard as defined in claim 1, and further comprising a spacing element arranged to provide a permanent distance from said protective element to a sawing power tool housing and including a rib projecting outwardly from one of said side walls and arranged to slide over the sawing power tool housing during turning of said protective element.

8. A safety guard as defined in claim 1, wherein at least said side walls of said protective element are transparent.

9. A safety guard as defined in claim 1, wherein at least said side walls of said protective element are translucent.

10. A safety guard as defined in claim 1, wherein at least said side walls of said protective element are opaque.

11. A safety guard as defined in claim 1, wherein said side walls include a front side wall which is arranged to face an operator, an upper side of said front wall being opaque, while a lower side of said front wall being transparent.

12. A safety guard as defined in claim 1, wherein said means for turning include an opening formed in both said side walls in the region of said edge.

13. A safety guard as defined in claim 1, wherein said means for turning include two openings formed in both said side walls in the region of said edge, and a hollow boss having an inner opening and arranged between said side walls so that said inner opening of said boss coincides with said openings of said side walls.

14. A safety guard as defined in claim 1, wherein said protective element including said side walls and said peripheral wall, is formed as a one-piece element.

* * * * *